United States Patent [19]

Fujikawa et al.

[11] Patent Number: 4,935,689
[45] Date of Patent: Jun. 19, 1990

[54] VEHICLE MOUNTED ENGINE GENERATOR SYSTEM

[75] Inventors: Tetsuzo Fujikawa, Kobe; Yoichi Yamaguchi, Akashi; Masao Shirakawa, Kobe, all of Japan

[73] Assignee: Kawasaki Jukogyo Kabushiki Kaisha, Japan

[21] Appl. No.: 183,550

[22] Filed: Apr. 18, 1988

Related U.S. Application Data

[63] Continuation of Ser. No. 10,415, Feb. 3, 1987, abandoned.

[51] Int. Cl.$^5$ .............. H02P 9/00; F02D 25/00; B60H 3/04; F01P 7/10
[52] U.S. Cl. .............................. 322/1; 60/714; 123/DIG. 8; 123/142.5 R; 307/84; 322/100
[58] Field of Search ............ 322/1, 100; 123/DIG. 8, 123/142.5; 307/84; 320/56; 60/714

[56] References Cited

U.S. PATENT DOCUMENTS 4,531,379 7/1985 Diefenthaler, Jr. ...... 123/DIG. 8 X
4,611,466 9/1986 Keedy .................................. 60/714

Primary Examiner—R. J. Hickey

[57] ABSTRACT

A vehicle mounted engine generator system is disclosed for supplying electricity to external electrical appliances and equipment used inside a camping car or outdoors in the camping site, which comprises a secondary water-cooled internal combustion engine of relatively small size and an engine generator electrically connected to the engine. The secondary engine has its cooling jacket connected to a cooling line supplying it with cooling water for engine cooling. Also, the cooling line is connected to a radiator connected to the main internal combustion engine of water-cooled type so that the heated cooling water through the secondary engine is cooled by the same radiator as for the main engine. Also, the secondary engine is electrically connected to the battery for the main engine in such a manner that the battery can be recharged from the secondary engine as well.

2 Claims, 2 Drawing Sheets

VEHICLE MOUNTED ENGINE GENERATOR SYSTEM

This application is a continuation, of application Ser. No. 010,415, filed Feb. 3, 1987, now abandoned.

BACKGROUND OF THE INVENTION (1) Field of the Invention:

This invention relates to a portable vehicle mounted engine generator system for vehicles which is employed to power electrical appliances and tools.

(2) Description of the Prior Art:

Camping trailers and vans as well as other work vehicles may carry a variety of electrical appliances and equipment which are operated inside the vehicle or outdoors. When these gadgets are employed, the vehicle engine may be kept running so that the engine generator supplies electricity to them. This method, however, will cause a noise problem. In an alternate way, electricity may be derived from a chargeable battery, without running the engine. A problem with this method is relatively insufficient battery capacity. To obviate these difficulties, portable vehicle mounted engine generators with their own small-sized engines have come to be employed as souces of electricity for vehicle mounted electrical appliances and tools.

Normally, such portable engine generators are mounted at a fixed position inside the vehicle and selected for the vehicle for such an engine generator to mount in, permitting the user to install a type of desired specification. Generally, a relatively small-sized internal combustion engine is connected to the generator through the former's output shaft into an integrated unit.

In some instances, engine generators are driven by a water-cooled engine, which in turn is started by a connected secondary battery.

Thus, apart from its main drive system including a main internal combustion engine, which may be of the water-cooled type with a battery system both for engine starting and other vehicle electric circuits, the vehicle has to carry an extra unit of engine and generator system for electrical appliances and equipment.

When a water-cooled type engine is employed to drive the engine generator, a separate radiator has also to be equipped for the engine, together with a secondary battery to restart the engine. These components are generally mounted as an independent assembly of the main drive system of the vehicle.

In the prior art, as illustrated in FIG. 3, a typical vehicle equipped with such an engine generator system includes a primary cooling system interconnected between a main water-cooled type internal combustion engine E1 for driving the vehicle, a cooling water pump P1 operatively connected to a radiator R1 for cooling the engine E1, and a heater H1 connected to the cooling jacket of the engine E1 for warming the vehicle interior. A secondary cooling system is provided interconnected between a secondary water-cooled engine E2 for a secondary generator G2 and a secondary cooling water pump P2 operatively connected to a radiator R2 for cooling the engine E2. The both systems are constructed in a separate setup from each other.

Also, a conventional arrangement as explained above may consist of two separate electrical circuitries, as shown in FIG. 4, the primary circuit for the main vehicle engine E1 comprising a battery B1, to which loads D1 such as the lights and ignition system of the vehicle are connected, and the secondary circuit for the secondary engine E2 including the engine generator G2, to which loads D2 such as external electrical appliances and tools are connected.

However, those prior art engine generator systems have been found to pose various problems. First, the installation of two separate engine cooling units with separate electrical systems result in doubling maintenance work.

Secondly, in a case where both engines have to be started simultaneously, particularly under cold climate, some cumbrance is involved to individually warm them up. Even if either one was already running, it tends to take a long time to get the other started.

Furthermore, when the main battery for the vehicle engine has been exhausted to complete discharge, there will be no means to restart the engine unless an auxiliary battery is not equipped, properly charged to supersede the main one.

Finally but most important, the employment of batteries and radiators in two sets not only demand extra costs of construction and maintenance but also space within the vehicle.

The present invention has been proposed to eliminate the above-mentioned drawbacks of difficulty with the prior art engine generator systems.

SUMMARY OF THE INVENTION

It is therefore a primary objective of the present invention to provide a vehicle mounted engine driven generator system suitable for mounting in vehicles which can provide for reducing battery and cooling water maintenance efforts and decrease not only production costs and overall system dimensions by sharing part of the components of the main engine system.

DETAILED DESCRIPTION OF PREFERRED EMBODIMENTS

Preferred embodiments of the present invention will be described in full detail in conjunction with the accompanying drawings.

Figure 1:
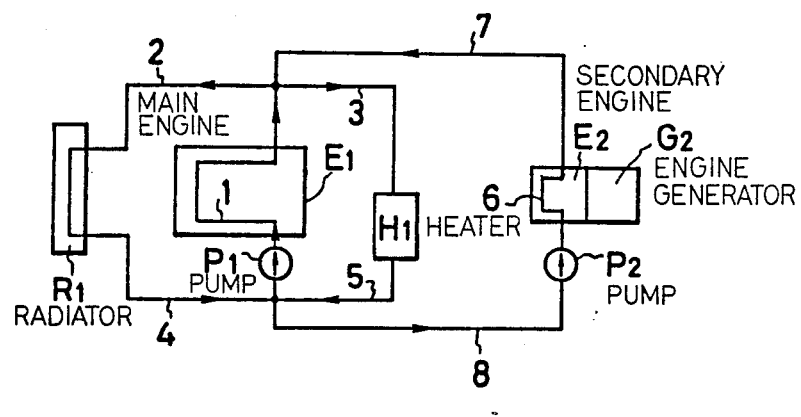
FIG. 1 is a diagram showing an engine cooling system for vehicle mounted engine generator systems according to a preferred embodiment of the present invention.

Referring first to FIG. 1, which is a diagram illustrating a largely combined cooling system for main and secondary engines constructed in accordance with the present invention, a main water-cooled internal combustion engine E1 for driving the vehicle has its cooling jacket 1 connected to a cooling pump P1 which supplies it with cooling water for engine cooling through a first cooling system in which the cooling pump P1 is installed. The cooling pump P1 is driven by the engine E1 to force the heated cooling water from the water jacket 1 of the engine E1 in operation to flow into branched going-out lines, the one connected to a radiator R1 where the heated cooling water is cooled for reuse and the other a heater H1 where the heat is recovered from the heated water for warming the vehicle interior.

The radiator R1 and heater H1 are connected to the cooling water pump P1 through return lines 4 and 5, respectively, to conduct the cooling water back to the pump for recirculation.

A vehicle mounted engine generator G2 is mounted drivingly connected to a secondary water-cooled internal combustion engine E2 which, in turn is connected to a second cooling water pump P2 for supplying the engine with cooling water for engine cooling through a second cooling system comprised of a going-out passage 7 and a return passage 8. The going-out passage 7 is connected at a downstream point of t P2 to the junction where the going-out lines 2 and 3 of the first cooling system merge. The return passage 8 is connected at a upstream point of the pump P2 to the junction between the return lines 4 and 5.

The secondary engine E2 drives the cooling water pump P2 to force the heated water from the jacket 6 of the secondary engine E2 to move through the going-out passage 7 and then advance into the radiator R1 for heat dissipation or the heater H1 for heat recovery.

With this arrangement, the cooling water from the second cooling system, upon heating through the jacket 6 of the secondary engine E2, is allowed to circulate through the cooling system for the primary engine E1 for heat exchange in the radiator R1 and heater H1 before it goes back to the second cooling pump P2. Also, this arrangement provides the advantage that, since the vehicle mounted engine generator system shares partly the components of the main engine cooling system, overall system dimension and construction cost can be correspondingly reduced.

In addition, maintenance of a cooling system, together with cooling water, will be more eased than with the conventional arrangements where two cooling systems for main and secondary engines have to be taken care of.

A further advantage is that, if one of the engine E1 and E2 was already running long enough to warm the cooling water in the combined cooling system, it will take no long time to get the other started, which is very convenient particularly under cold weather.

A still further advantage is that, should the main engine E1 fail, with the main battery left dead, so that the heater H1 cannot be fired in a cold day, the secondary engine E2 may be driven so that the water to the heater H1 can be heated enough for warming.

Figure 2:
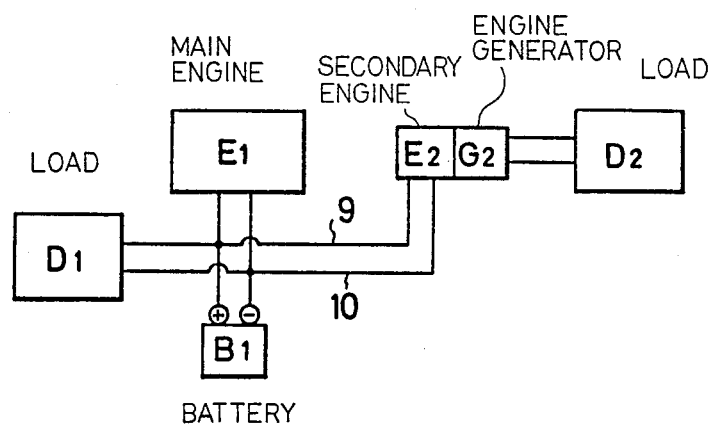
FIG. 2 is a diagram showing an electrical system for vehicle mounted engine generators according to the preferred embodiment of the present invention.
Figure 3:
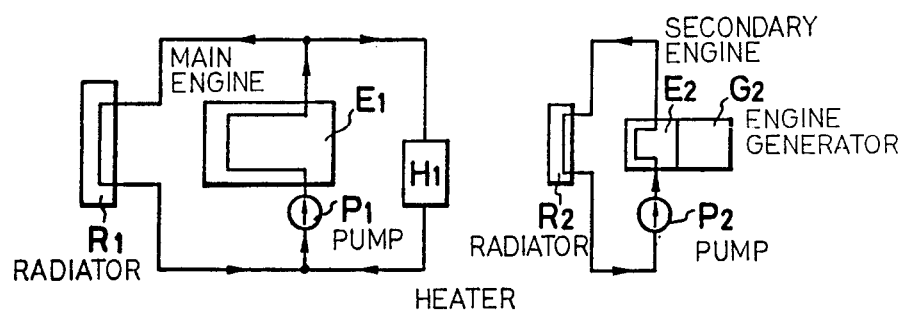
FIG. 3 is a diagram showing the engine cooling system for conventional engine generator systems.

Referring then to FIG. 2, description will be made of an electrical system for a vehicle having a main battery and a vehicle mounted engine generator system according to a second embodiment of the invention having an engine cooling system similar to the one depicted in FIG. 1.

A main water-cooled internal combustion engine E1 for driving the vehicle has a main battery B1 connected thereto. The battery B1 is charged by the engine E1 through a flywheel magnet or generator in a conventional manner. The battery B1 is designed to supply electricity to internal loads D1 including the lights, ignition system, audio equipment, and air conditioner and start the engine E1.

A secondary engine E2 is connected to a vehicle mounted engine generator G2 into an integrated unit in which the generator G2 is driven by the engine E2 to power various external loads D2 such as domestic appliances and tools for operation inside the vehicle or outdoors in the camping site.

Also, the secondary engine E2 is connected to the main battery B1 through electrical wires 9 and 10 so that the battery B1 can be charged by the engine E2 through a built-in flywheel magnet as well.

Figure 4:
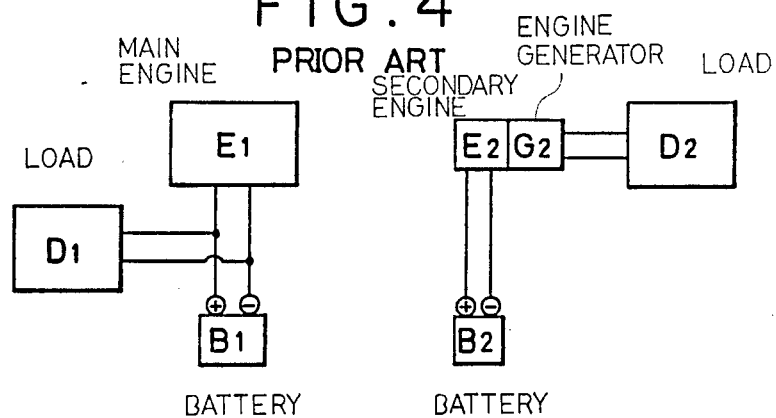
FIG. 4 is a diagram showing the electrical system for conventional engine generator systems.

This embodiment having the cooling system of FIG. 1 and the electrical system of FIG. 2 offers various advantages as follows:

First, the arrangement eliminates the second battery B2 of the conventional systems (FIG. 4) reducing overall system dimensions and construction costs. Furthermore, maintenance will be more eased than with the conventional arrangements where there are two battery systems to take care of.

Secondly, should the battery B1 be completely discharged making it impossible to get the vehicle engine E1 started, the inconvenience can easily be solved by manually rotating the secondary engine E2, which is generally of relatively small size enough to be operated by hand, not only to recharge the battery B1 but also warm the cooling water in the combined cooling system so that the main engine E1 can be restarted.

In addition, should the main engine E1 fail, with the main battery B1 left dead in a vehicle standing outdoors, so that any of the internal electrical gadgets cannot be operated, the secondary generator system E2, G2 may be activated to recharge the battery so that a car heater, air conditioner, or audio equipment will be used.

It should be added that, since radiators are normally built to have more cooling capacity than to cool a vehicle engine running at its maximum and a small-sized engine is used for the secondary engine E2, there will be no or little problem with a radiator taking care of main and secondary engines at the same time.

An additional advantage to the present invention is that, if the same type of gasoline is employed in the main and secondary engines, they can share a single fuel tank, which further reduces construction costs and maintenance labor.

It will be clear from the above that the above object and features are accompanied by the improved secondary engine-driven generator according to the present invention.

What is claimed is:

1. An engine generator system suitable for mounting on a vehicle comprising a main and a secondary water-cooled internal combustion engine and a water circulation cooling system having a radiator, a heater and cooling pumps for cooling said main and secondary engines, said generator system being adapted to supply electricity to external portable or in-vehicle electrical equipment, said generator system further comprising an engine generator operatively connected to said secondary engine to generate and supply electricity to a vehicle electrical power source, and a water circulation cooling line connected to cooling jackets in said main and secondary engines for cooling, said cooling line being connected branchingly to both said radiator and said heater to supply heated coolant from said cooling jackets of said main and secondary engines, said radiator and said heater being connected branchingly to both said main and secondary engines to supply coolant thereto.

2. An engine generator as set forth in claim 1, wherein said water circulation cooling line has a cooling pump connected on the downstream side to both said radiator and said heater.

* * * * *